Patented Oct. 3, 1944

2,359,521

UNITED STATES PATENT OFFICE 2,359,521

CULTURE OF YEAST

Horace E. Harrison, East Brunswick Township, Middlesex County, N. J., assignor to Anheuser-Busch, Incorporated, St. Louis, Mo., a corporation of Missouri No Drawing. Application May 9, 1941,
Serial No. 392,735

8 Claims. (Cl. 195—82)

This invention relates to the culture of yeast. Yeast, produced in an ordinary commercial mash or wort containing assimilable nitrogen and carbon and nutrient salts, contains enough vitamin $B_1$ for its own needs for growth but little, if any, more. For instance, the content of vitamin $B_1$ in commercial bakers' yeast normally ranges from 40 to 60 micrograms per gram of dry yeast. The principal object of the present invention is to devise a method of culturing yeast which will increase the vitamin $B_1$ content thereof very greatly in excess of the biological requirements of the yeast. The invention consists principally in adding to the commercial mash or wort certain chemical compounds which yeast has the capacity to synthesize into vitamin $B_1$ or a compound thereof of substantially the same physiological utility and to store in its cells the excess of the product beyond the biological needs of the yeast. It also consists in the process and in the product hereinafter described and claimed.

The process of culturing or growing yeast in a commercial fermentor is commonly called the fermentation of the nutrient mash. During such fermentation, little or no alcohol is produced. The term "culture" or "fermentation" as used in this specification means the active biological process of the yeast while it is in the mash and may involve any of the stages of yeast activity such as the multiplication of cells, the production of some intermediate metabolic products, or process, or enzymatic changes prior to the separation of the yeast for commercial disposition.

The essential chemical structure of vitamin $B_1$ is represented by the following formula wherein X represents chlorine or bromine or a radical which is needed to satisfy the chemical valence of the nitrogen but apparently has little effect on the physiological properties of the vitamin.

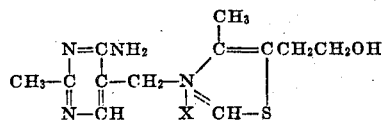

As shown by this formula, the essential chemical structure of vitamin $B_1$ consists of a pyrimidine derivative linked to a thiazole derivative by a methylene (—$CH_2$—) radical. Heretofore the synthesis of vitamin $B_1$ has been effected when using a suitable pyrimidine derivative and a suitable thiazole derivative, but such synthesis has been quite expensive by reason of it requiring the use of an expensive pyrimidine derivative having a methylene (—$CH_2$—R) group in the number 5 position or by reason of it involving the use of a rather long and indirect process. I have discovered a shorter and more direct process for effecting such synthesis by the use of a pyrimidine derivative that is considerably less expensive than one having the methylene radical in its number 5 position.

According to the present invention, a suitable thiazole derivative, such as 4-methyl-5-beta-hydroxyethyl thiazole, and a pyrimidine derivative containing a cyano radical in the number 5 position, such as 2-methyl-5-cyano-6 aminopyrimidine, are added, in equimolecular proportion, to the fermenting mash, preferably in a late stage of the manufacturing process. The vigorous aeration of the fermenting mash effects ample mixing of the added compounds therewith. The temperature of the fermenting mash may range from about 25° C. to about 35° C. but it is preferable to keep it between 28° C. and 30° C. The hydrogen ion concentration of the mash preferably approximates pH 5.5 or pH 6 but may range from about pH 5 to about pH 7. Under the conditions just stated, the yeast is able to establish the required methylene linkage between the pyrimidine ring and the nitrogen of the thiazole ring, the biological action of the yeast bringing about the chemical synthesis from the constituent ingredients.

On the basis of my researches and experiments, I believe any thiazole derivative could be used in this process which conforms to the formula 4-methyl-5-beta-(X)-ethyl-thiazole wherein X designates a radical that can be readily hydrolyzed or otherwise converted to the beta-hydroxyethyl radical. 4-methyl-5-beta-hydroxyethyl-thiazole has given successful and satisfactory results in my process when used with 2-methyl-5-cyano-6-amino-pyrimidine. Simple derivatives of the cyano-pyrimidine compound may be used instead of it in this process.

The following is a specific example of my process.

While yeast was being grown in an ordinary commercial mash or aqueous medium at a temperature of about 28° centigrade and containing the usual yeast-assimilable nitrogen compounds, carbon compounds and nutrient salts, equimolecular amounts of 4-methyl-5-beta-hydroxyethyl-thiazole (0.079 gram) and 2-methyl-5-cyano-6-aminopyrimidine (0.0738 gram) were added to the fermenting mash and thereafter the yeast was separated in accordance with usual commercial practice. During the fermentation of the mash, the hydrogen ion concentration was kept at about pH 5.5 or pH 6. The dry yeast recovered from this mash contained 701 micrograms of vitamin $B_1$ per gram of yeast, while a control fermentation of the same nutrient medium to which no thiazole or pyrimidine compound had been added contained only 50 micrograms $B_1$ per gram of dried yeast. The potency of the cultured yeast varies with the amounts of the thiazole and pyrimidine derivatives added to the mash and by using suitable quantities of such derivatives in equimolecular proportion, the yeast may be made to contain approximately any practically desirable quantity of vitamin $B_1$, for instance, about 100 or 120 micrograms per gram of dry yeast for some use, 200 or 250 micrograms for another use and higher potencies for still other uses.

What I claim is:

1. The process for the production of yeast, high in vitamin $B_1$ content, comprising adding to a yeast culture 4-methyl-5-beta-hydroxyethyl thiazole and 2-methyl-5-cyano-6-aminopyrimidine.

2. The process for the production of yeast, high in vitamin $B_1$ content, comprising adding to a yeast culture 4-methyl-5-beta-(X)-ethyl-thiazole, in which (X) represents a radical readily hydrolyzable and replaceable by a hydroxyl radical and 2-methyl-5-cyano-6-aminopyrimidine.

3. The process for the production of yeast, high in vitamin $B_1$ content, comprising adding to a yeast culture 4-methyl-5-beta-(X)-ethyl-thiazole, in which (X) represents a radical readily hydrolyzable and replaceable by a hydroxyl radical, and 2-methyl-5-cyano-6-aminopyrimidine, in equimolecular amounts.

4. The process for the production of yeast high in vitamin $B_1$ content, comprising adding to a yeast culture 4-methyl-5-beta-(X)-ethyl-thiazole, in which (X) represents a radical readily hydrolyzable and replaceable by a hydroxyl radical, and 2-methyl-5-cyano-(R)-6-aminopyrimidine, in which cyano-(R) represents a derivative readily transformable to a methylene linkage between the pyrimidine ring and the nitrogen of the thiazole ring.

5. The process for the production of yeast high in vitamin $B_1$ content as described in claim 1 and regulating the hydrogen ion concentration between pH 5.0 and pH 7.0.

6. The process for the production of yeast high in vitamin $B_1$ content as described in claim 1, regulating the hydrogen ion between 5.0 and 7.0 and maintaining a temperature within the range of approximately 25° C. and 35° C.

7. The process of producing yeast with a high vitamin $B_1$ content which consists in growing yeast in an aqueous medium of yeast nutrients, 4-methyl-5-beta-hydroxyethyl-thiazole and 2-methyl-5-cyano-6-aminopyrimidine.

8. The process of producing yeast with a high vitamin $B_1$ content which consists in growing yeast in an aqueous medium of yeast nutrients, 4-methyl-5-beta-hydroxyethyl-thiazole and 2-methyl-5-cyano-6-aminopyrimidine, in which medium the thiazole and pyrimidine compounds are in equimolecular amounts.

HORACE E. HARRISON.